United States Patent [19]

Tabankia et al.

[11] Patent Number: 4,900,784
[45] Date of Patent: Feb. 13, 1990

[54] PBT-PC-RUBBER-BROMINATED FR HIGH TRACKING RESISTANCE+VO

[75] Inventors: Farshid M. H. Tabankia, Brasschaat, Belgium; Jan de Boer, Bergen op Zoom, Netherlands

[73] Assignee: General Electric Company, Pittsfield, Mass.

[21] Appl. No.: 269,830

[22] Filed: Nov. 10, 1988

[30] Foreign Application Priority Data

Dec. 24, 1987 [NL] Netherlands ................... 8703130

[51] Int. Cl.$^4$ ............................................. C08L 69/00
[52] U.S. Cl. ...................................... 525/67; 525/146
[58] Field of Search ............... 525/67, 146, 439, 466, 525/902

[56] References Cited

U.S. PATENT DOCUMENTS

| | | | |
|---|---|---|---|
| 3,169,121 | 2/1965 | Goldberg | 528/173 |
| 3,864,428 | 2/1975 | Nakamura et al. | 525/67 |
| 4,001,184 | 1/1977 | Scott | 528/182 |
| 4,417,018 | 11/1983 | Ogawa et al. | 524/261 |
| 4,535,124 | 8/1985 | Binsack et al. | 525/67 |
| 4,539,370 | 9/1985 | Nouvertne et al. | 525/67 |
| 4,554,315 | 11/1985 | Chung et al. | 525/67 |
| 4,629,760 | 12/1986 | Liu et al. | 525/67 |
| 4,636,544 | 1/1987 | Hepp | 524/411 |

FOREIGN PATENT DOCUMENTS

| | | |
|---|---|---|
| 079477 | 5/1983 | European Pat. Off. . |
| 0107048 | 5/1984 | European Pat. Off. . |
| 0110222 | 6/1984 | European Pat. Off. . |
| 0020605 | 1/1985 | European Pat. Off. . |
| 0158822 | 10/1985 | European Pat. Off. . |
| 1568625 | 6/1980 | United Kingdom . |

*Primary Examiner*—Theodore E. Pertilla
*Attorney, Agent, or Firm*—William F. Mufatti

[57] ABSTRACT

The invention relates to polymer mixtures having a comparative tracking index of more than 400 volts (KC) and a VO-value according to UL-94. The polymer mixtures according to the invention comprise a polybutylene teraphthalate, an aromatic polycarbonate, a brominated polystyrene, and an agent to improve the impact strength.

7 Claims, No Drawings

PBT-PC-RUBBER-BROMINATED FR HIGH TRACKING RESISTANCE+VO

Polymer mixture having a polybutylene terephthalate and a brominated polystyrene, and articles formed therefrom.

The invention relates to a polymer mixture which comprises
 a. a polybutylene terephthalate and
 b. a brominated polystyrene as a flame retardant.

The invention also relates to articles formed from such polymer mixtures.

Polybutylene terephthalate is a known polymer. It is used, for example, in the manufacture of electrical connectors. In such and similar applications the need exists of materials having an as low as possible flammability and an as high as possible tracking index. It is known to improve the flame retarding properties of polybutylene terephthalate by the addition of a brominated polystyrene in combination with a synergist. In this manner good flame-retarding properties can be obtained (V-O according to UL94 at ¾ mm). However, these known polymer mixtures have an insufficiently high tracking index (namely a comparative tracking index of approximately 200 volts).

The invention provides polymer mixtures which combine good flame-retarding properties with a good tracking index.

The polymer mixture according to the invention is characterised in that it comprises in addition the following constituents:
 c. an aromatic polycarbonate,
 d. an agent to improve the impact strength.

The polymer mixture according to the invention is preferably composed so that it comprises
 a. 60-85% by weight of polybutylene terepthalate,
 b. 5-20% by weight of brominated polystyrene,
 c. 5-25% by weight of aromatic polycarbonate, and
 d. 5-15% by weight of the agent to improve the impact strength, the weight percentages being calculated with respect to the sum of the connstituents a, b, c, and d.

As constituent a. the polymer mixture according to the invention comprises a polymer or a copolymer which is built up for more than 70 mol% from units derived from terephthalic acid and butane-1,4-diol.

It is possible to use in the polymer mixture according to the invention a metal compound (for example, antimony oxide) which cooperates synergistically with the brominated polystyrene.

The polymer mixture according to the invention preferably comprises as agent c. to improve the impact strength a core-shell copolymer prepared in various stages and built up from a rubber-like core on which one or more shells have been grafted.

The polymer mixture according to the invention may comprise 1-100 parts by weight of conventional additives per 100 parts by weight of a. plus b. plus c. plus d.

The polymer mixture according to the invention comprises at any rate the following constituents: a. a polybutylene terephthalate, b. a brominated polystyrene as a flame retardant, c. an aromatic polycarbonate, and d. an agent to improve the impact strength.

a. Polybutylene therephthalate

Polybutylene terephthalate is a polymer known per se. It is derived from butane-1,4-diol and terephthalic acid. It is possible to use copolyesters in the polymer mixtures in which a part of the diol compound and/or a part of the terephthalate acid has been replaced by another diol and/or carboxylic acid. For the polymer mixtures according to the invention it is to be preferred to use a polybutylene terephthalate which is built up for more than 70 mol% from units derived from butane-1,4-diol and terephthalic acid.

It is possible to use polybutylene terephthalate in which a branching agent, for example, a glycol having more than three or more hydroxyl groups or a trifunctional or polyfunctional carboxylic acid has been incorporated.

b. Brominated polystyrene

Brominated polystyrenes are flame retardants known per se for plastics. They are commercially available. They may comprise, for example, approximately 40-70% by weight of bromine.

c. Aromatic polycarbonate

Aromatic polycarbonates are materials known per se. They are generally prepared by reacting a dihydric phenol compound with a carbonate precursor, for example, phosgene, a halogen formate or a carbonate ester. Aromatic polycarbonates are polymers which comprise units of the formula

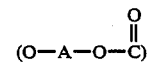

wherein A is a bivalent aromatic radical derived from the dihydric phenol used in the preparation of the polymer. As dihydric phenols in the preparation of the aromatic polycarbonates may be used mononuclear or polynuclear aromatic compounds which comprise two hydroxy radicals each bonded directly to a carbon atom of an aromatic nucleus.

The known branched polycarbonates as described, for example, in US-A-4,001,184 are also suitable.

Suitable aromatic polycarbonates are also the so-called polyester carbonates which are obtained by performing the polymerisation reaction in the presence of an ester precursor, for example, a difunctional carboxylic acid, for example, terephthalic acid or an ester-forming derivative thereof. These polyester carbonates have ester compounds and carbonate compounds in the polymeric chain. Polyester carbonates are described, for example, in US-A-3,169,121.

d. Agent to improve the impact strength

The polymer mixture according to the invention comprises one or more agents to improve the impact strength. Any known agent to improve the impact strength of polymer mixtures which comprise an aromatic polycarbonate and a polyalkylene terephthalate may be used in the polymer mixture according to the invention.

As an agent to improve the impact strength is preferably used in the polymer mixture according to the invention a core-shell polymer prepared in various stages and on which one or more shells have been grafted. The rubber-like core may be built up from rubber-like polyacrylates, or from rubber-like polydienes, for example, polybutadiene. The rubber-like core may comprise comonomers, for example, styrenes, acrylonitrile. Monomers are grafted on the core, for example, acrylates and/or styrene compounds and/or acrylonitrile.

The presence of each one of the constituents mentioned hereinbefore is required to obtain a polybutylene terephthalate-containing polymer mixture having the desired properties, namely good flame-retardance and high tracking index.

The use of flame retardants other than brominated polystyrene is not possible: the above-mentioned combination of properties then is not obtained.

The presence of an agent to improve the impact strength is required: in the absence of such an agent the above-mentioned combination of properties is not obtained either.

The presence of an aromatic polycarbonate prevents the occurrence of delamination.

In addition to the constituents mentioned hereinbefore the polymer mixture according to the invention may comprise one or more of the additives conventionally used for polymer mixtures.

The polymer mixture according to the invention may comprise as additives, for example, polyolefins, release agents, further agents to improve the flame-retarding properties, stabilisers, pigments and dyes, fillers, for example, reinforcing fibres.

It is desired in particular to incorporate a stabiliser in the polymer mixture in order to prevent an esterification reaction between the polybutylene terephthalate and the aromatic polycarbonate. Such stabilisers are generally known.

The polymer mixture according to the invention can be obtained according to the usual methods of preparing polymer mixtures, for example, by melt extrusion.

Examples I–III, comparative examples A–D

Various polymer mixtures were prepared starting from the following constituents:

PBT: polybutylene terephthalate having an intrinsic viscosity of 122 ml/g, measured in a phenol-tetrachloroethane 60/40 mixture at 25° C. according to ASTM D 2857-70 using a viscosimeter according to DIN 51562.

FR1: brominated polystyrene having a bromine content of approximately 65% by weight.

FR2: a chlorine-containing organic flame retardant

FR3: a flame retardant on the basis of a brominated oligomer of an aromatic polycarbonate.

$Sb_2O_3$: a known agent having synergistic acitivity for flame retardants.

PC: an aromatic polycarbonate derived from bisphenol A and phosgene having an intrinsic viscosity of 58.5 ml/g measured in methylene chloride at 25° C.

IM1: an agent to improve the impact strength of the core-shell type built up from a core consisting substantially of polybutadiene on which various monomers, mainly styrene and acrylates, have been grafted.

IM2: an agent to improve the impact strength of the core-shell type built up from a core consisting substantially of a polybutyl acrylate rubber on which one or more acrylates have been grafted.

EEA: poly(ethylene-ethyl acrylate).

$H_3PO_3$: a transesterification stabiliser.

Stab: a mixture of conventional stabilisers.

$TiO_2$: a pigment.

The said constituents were extruded in an extruder. The resulting strands were chopped to pellets. Standardised plates and rods were injection-moulded from the pellets to determine the flammability class according to UL-94 and to determine the comparative tracking index according to IEC, 1979 (3rd edition).

The quantities used of the said constituents and the results found are recorded in the table hereinafter.

TABLE

|  | Example |  |  |  |  |  |  |
|---|---|---|---|---|---|---|---|
|  | A | B | C | D | I | II | III |
| Composition (wt. parts) | | | | | | | |
| PBT | 70 | 68 | 55.5 | 60.5 | 60.3 | 57.5 | 60.5 |
| PC | 15 | 15 | 15 | 15 | 15 | 15 | 15 |
| FR1 | 11 | 11 | — | — | 11 | 11 | 11 |
| FR2 | — | — | — | 11 | — | — | — |
| FR3 | — | — | 16 | — | — | — | — |
| $Sb_2O_3$ | 3.5 | 3.5 | 3.5 | 3.5 | 3.5 | 3.5 | 3.5 |
| IM1 | — | — | 7.5 | 7.5 | 7.5 | 7.5 | — |
| IM2 | — | — | — | — | — | — | 7.5 |
| EEA | — | 2 | 2 | 2 | 2 | 2 | 2 |
| $H_3PO_3$ | 0.08 | 0.08 | 0.08 | 0.08 | 0.08 | 0.08 | 0.08 |
| Stab | 0.50 | 0.50 | 0.50 | 0.50 | 0.50 | 0.50 | 0.50 |
| $TiO_2$ | — | — | — | — | — | 3 | — |
| Results | | | | | | | |
| CTI (KC) V | 400 | 350 | 250 | >600 | >600 | >600 | >600 |
| UL rating (1.6 mm) | V-0 | V-0 | V-2 | V-2 | V-0 | V-0 | V-0 |

It may be seen from the above results that the polymer mixtures according to the invention (examples I, II and III) always show a combination of good flame-retarding properties and a high tracking index.

The nature of the agent used to improve the impact strength does not seem to be of importance (see examples II and III). Of essential importance is that such an agent is present (see comparative examples A and B). The nature of the flame retardant used is of importance indeed (see comparative examples C and D).

We claim:

1. A polymer mixture which consists of the following constituents:
   a. a polybutylene terephthalate;
   b. a brominated polystyrene as a flame retardant, characterized in that the polymer mixture moreover consists of the following constituents;
   c. an aromatic polycarbonate; and
   d. agent to improve the impact strength.

2. A polymer mixture as claimed in claim 1, wherein the polymer mixture consisting of
   a. 60–85% by weight of polybutylene terephthalate,
   b. 5–20% by weight of brominated polystyrene,
   c. 5–25% by weight of aromatic polycarbonate, and
   d. 5–15% by weight of the agent to improve the impact strength, the weight percentages being calculated with respect to the sum of the constituents a, b, c, and d.

3. A polymer mixture as claimed in claim 1, wherein constituent a. is a polymer or a copolymer which is built up for more than 70 mol % from units derived from terephthalic acid and butane-1,4-diol.

4. A polymer mixture as claimed in claim 1, wherein the polymer mixture consists of a metal compound which cooperates synergistically with the brominated polystyrene.

5. A polymer mixture as claimed in claim 1, wherein agent c. is a core-shell copolymer prepared in various stages and built up from a rubber-like core on which one or more shells have been grafted.

6. A polymer mixture as claimed in claim 1, wherein, in addition to the constituents mentioned hereinbefore sub a, b, c, and d, the polymer mixture consists of 1–100 parts by weight of additives per 100 parts by weight of a. plus b. plus c. plus d.

7. Articles formed from the polymer mixture as claimed in claim 1.

* * * * *